3,143,463
1-(PARA-HALOPHENYL)-2-LOWERALKYL - AMINO PROPANE: WEIGHT REDUCING COMPOSITION AND METHOD
Torkil O. Holm, Copenhagen, Denmark, and Rudolf Kopf, Bergisch-Gladbach, Germany, assignors to H. Lundbeck & Co., Kemisk Pharmaceutisk Laboratorium A/S, Copenhagen, Valby, Denmark
No Drawing. Filed Dec. 21, 1959, Ser. No. 860,637
13 Claims. (Cl. 167—22)

This invention relates to a weight-reducing composition and is more particularly concerned with a novel composition primarily intended for oral use which, while very effective in appetite- and weight-reduction, exhibits only negligible central stimulatory effect.

It has been shown in the past that certain sympathomimetic agents exert anorexigenic and weight-reducing effects. However, it has also been found that while agents of this nature are in fact highly useful for their appetite-depressant and weight-reducing effect, they simultaneously exert a strong central stimulatory effect, with resulting symptoms of anxiety, restlessness and insomnia. As examples of sympathomimetic agents already known to play such a dual role may be mentioned amphetamine (1-phenyl-2-aminopropane), methamphetamine (d-1-phenyl-2-methylaminopropane), and 1-phenyl-2-methyl-2-aminopropane. It would obviously be highly desirable to have available a composition which would be anorexigenically active and effective in weight reduction without attendant undesirable central stimulatory effect. For a considerable number of years, investigators have made a determined effort to find such a satisfactory drug in the amphetamine area. Failing here, they have turned to other structural areas. Some of the results of these investigations have been encouraging, and several promising drugs of non-amphetamine type have appeared on the market and are now in use or in advanced stages of clinical trial. Among these may be mentioned phenmetrazine (3-methyl-2-phenylmorpholine), a mixture of phenylethylacetic acid(phenylmethyl)-morpholino-N-ethanolester hydrochloride and phenyl-methyl-morpholino-(dimethyl-chloro)-xanthinate, 5-methyl-5-(1,2-dibromo-2-phenylethyl)-hydantoin, and others. However, all of these drugs for one reason or another leave much to be desired. The need for other and improved compositions for the effective reduction of appetite and weight without undesirable central stimulatory effect is apparent.

It is therefore an object of the present invention to provide novel compositions which are useful for the reduction of weight and appetite without the production of undesirable concurrent central stimulatory effect.

Another object of this invention is to provide novel 1-(para-chlorophenyl)-2-methyl-2-aminopropane and 1-(para-bromophenyl)-2-methyl-2-aminopropane compositions which are particularly well-adapted for oral administration to combat excessive appetite and weight and assist in the reduction or control of obesity, either alone or as an adjunct to a controlled diet, without producing an undesirable central stimulatory effect. Still another object of this invention is to provide a method of counteracting excess appetite and weight and thus controlling or combating obesity, without producing undesired central nervous system stimulation. Other objects of the invention will be apparent to those skilled in the art to which the invention pertains and still other objects will become apparent hereinafter.

The foregoing and additional objects have been accomplished by the provision of novel compositions containing as active ingredient 1-(para-chlorophenyl)-2-methyl-2-aminopropane or 1-(para-bromophenyl)-2-methyl-2-aminopropane or an acid addition salt thereof and a method for their oral administration.

The active ingredient of the novel compositions of the present invention is 1-(para-chlorphenyl)-2-methyl-2-aminopropane or 1-(para-bromophenyl)-2-methyl-2-aminopropane or an acid addition salt thereof. These products are closely related structurally to amphetamine and methamphetamine, but are most closely related to 1-phenyl-2-methyl-2-aminopropane. The free bases may be represented by the formula:

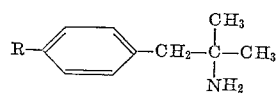

wherein R represents chloro or bromo.

As used throughout this specification, the term "active ingredient" refers to such 1-(para-chlorophenyl)-2-methyl-2-aminopropane or 1-(para-bromophenyl)-2-methyl-2-aminopropane free base or an acid addition salt thereof.

When employing the active ingredient of the compositions of the invention in the form of an acid addition salt, the acid is selected so as to contain an anion which is non-toxic and pharmacologically acceptable, at least in usual therapeutic doses. Representative salts which are included in this group are the hydrochlorides, hydrobromides, sulfates, acetates, phosphates, nitrates, quinates, methanesulfonates, ethanesulfonates, lactates, citrates, tartrates, and maleates. Other acid addition salts are equally suitable and may be employed if desired. For example, fumaric, benzoic, ascorbic, pamoic, succinic, salicylic, bismethylenesalicylic, propionic, gluconic, malic, malonic, mandelic, cinnamic, citraconic, stearic, palmitic, itaconic, glycolic, benzenesulfonic, and sulfamic acids may also be employed as acid addition salt-forming acids. The salts of 1-(para-chlorophenyl)-2-methyl-2-aminopropane or 1-(para-bromophenyl)-2-methyl-2-aminopropane with cation exchange resins deserve special mention, as they have provided valuable in oral sustained release preparations since the free base or a biologically-absorbable moiety is released from these resin salts slowly and over an extended period of time. These resin salts, therefore, likewise fall within the scope of those utilizable as the active ingredient according to the present invention.

In general the active ingredient of the novel compositions of the present invention can be conveniently prepared by a Hoffman degradation of 1,1-dimethyl-2-(para-chlorophenyl)-propionamide or 1,1-dimethyl-2-(para-bromophenyl)-propionamide and isolated in conventional manner either in the form of the free base or an acid addition salt thereof. Indication of typical suitable acid addition salts has already been given in the foregoing. While it is preferred to isolate and employ the active ingredient of the compositions of the present invention in the form of a solid or crystalline acid addition salt, if for any reason it is desired to employ the active ingredient in the form of the free base, it may be obtained according to conventional procedure, for example, by conducting the reaction for its production in a solvent and thereafter evaporating the solvent to obtain the reaction products as almost colorless oils, or by dissolving an isolated hydrochloride or other salt in water, neutralizing with a base such as ammonia, ammonium hydroxide, sodium carbonate or other suitable alkaline material, extracting the liberated base with a suitable solvent such as ether or benzene, drying the extract, and evaporating to dryness in vacuo or fractionally distilling. Addition salts may also be made from the free base according to conventional procedure by taking up or dissolving the free base in a suitable solvent and acidifying with the selected acid, the salt of which is desired, which in many cases results in precipitation of the desired acid addition salt. In other cases the desired salt may be isolated by cooling the solution or by evaporating excess solvent, or in similar known manner for the isolation of acid addition salts.

Certain of the acid addition salts may also be isolated directly from the Hoffman degradation reaction by adding the selected acid to a neutralized solvent solution of the reaction product.

1 - (para - bromophenyl) - 2 - methyl - 2 - aminopropane and the corresponding acid addition salts are previously unknown, and is in the form of the free base a colorless oil. The corresponding hydrochloride is a white, crystalline substance which melts at 234–236 degrees centigrade. The novel compositions of the present invention have proven to have advantages over phenmetrazine and amphetamine and related amphetamine-type products mentioned above. The novel compositions of the present invention, for example, demonstrate fewer side-effects than either phenmetrazine or amphetamine. In addition, the novel compositions of the present invention have been used successfully in treating patients clinically.

The favorable selective activity without untoward side-reactions is of the essence of the present invention. The remarkable oral activity demonstrated for the novel compositions of the present invention has not been suggested by the prior art during the period of availability of certain compounds which may constitute the active ingredient thereof, and the absence of untoward side-effects is most surprising in view of what would ordinarily be expected in view of the close relationship of the active ingredient of the compositions of the invention to known central stimulatory products.

According to the present invention, 1-(para-chlorophenyl)-2-methyl-2-aminopropane or 1-(parabromophenyl)-2-methyl-2-aminopropane, preferably in the form of an acid addition salt thereof, is associated with a non-toxic pharmaceutical diluent or carrier which may be either a solid material or a liquid. Bland carriers are preferred for some applications. The composition can take the form of tablets, powders, capsules, liquid solutions, emulsions or suspensions, or other dosage forms which are particularly useful for oral administration. Liquid or semi-liquid diluents may be employed for oral use. Such a medium can be or contain a solvent such as water. The only basic limitations of the liquid diluent used are compatibility and palatability. The compositions can take the form of 1-(para-chlorophenyl)-2-methyl-2-aminopropane or 1-(para-bromophenyl)-2-methyl-2-aminopropane or an acid addition salt thereof admixed with solid diluents and/or tableting adjuvants such as rice starch, corn starch, potato starch, lactose, saccharose, gelatin, talc, stearic acid, magnesium stearate, carboxymethylcellulose, gums such as gum acacia, or tragacanth, chicle, agar agar, or the like. Any of the tableting materials used in pharmaceutical practice can be employed where there is no incompatibility with the active ingredient. The material can be tableted or otherwise compounded with or without coactive materials. Alternatively, the active ingredient with or without adjuvant material can be placed in the usual capsule of absorbable material, such as the usual gelatin capsule, and administered in that form. High concentrations of 1-(para-chlorophenyl)-2-methyl-2-aminopropane or 1-(para-bromophenyl)-2-methyl-2-aminopropane or a salt thereof can be obtained by utilizing tablet triturates. In yet another embodiment, the powdered active ingredient with adjuvant material can be put into powder packets. Other examples of compositions in which the active ingredient may be embodied are as follows: the composition can be combined with foods of various kinds; it can be prepared in the form of a laminated or enteric coated tablet for prolonged action; it can be combined with an antacid or analgesic, e.g., aluminum hydroxide gel, calcium carbonate, magnesium oxide or trisilicate, acetylsalicylic acid, phenacetin, propoxyphen, or the like; it can be combined with phenobarbital or other sedative barbiturate or narcotic, for example, codeine or the like; it can be combined wtih local anesthetics effective in the gastrointestinal tract, such as procaine hydrochloride, novocaine, benzocaine, or the like; it can be combined with a diuretic compound, such as chlorthiazide, hydrochlorthiazide, or the like; or it may be combined with any other adjuvant or bulk-producing material, such as methylcellulose or carboxymethylcellulose, or combinations of the foregoing can be provided. Where the active ingredient is combined with one or more other pharmaceutically active materials, it is of course necessary that the materials be compatible and that the physiological effect of the active ingredient of the present invention not be adversely affected thereby. Besides the foregoing mentioned forms, the compositions of the invention may also take the form of candies, soft drinks, gums, lozenges, syrups, elixirs, and the like. Reference is made to U.S. Patents 1,907,203, 2,196,768 and 2,433,244 for suitable tablet coatings for lamination or enteric coatings; to U.S. Patent 2,875,130 for other sustained release type formulations which may be employed; to Remington on Pharmacy for various pharmaceutical formulations and procedures which may be employed; and to the specifications and examples of U.S. Patents 2,753,288 and 2,881,113 for additional pharmaceutical forms, carriers and types of formulations and combinations in which the active ingredient of this invention may be substituted for the active ingredient of the two patents in question.

The proportion of active ingredient in the compositions of the present invention can be varied. It is only necessary that the active ingredient constitute an effective amount, i.e., such that a suitable dosage will be obtained consistent with the dosage form employed. Obviously several unit dosage forms may be administered at about the same time. Not less than about five milligrams for small children and ten milligrams for adults is used per unit dose, since the use of less than such dosage has not demonstrated any practical value in attaining the desired results. Likewise, it has been found that although an amount greater than 75 milligrams of active ingredient is effective, it may increase the incidence of side effects somewhat and it is therefore preferred to use from about 15 to 50 milligrams per dosage unit in order to obtain almost complete selectivity of action, achieving desired anti-appetite and anti-obesity effect without untoward side-reactions. The figures given are for the hydrochlorides, and amounts of a particular acid addition salt will of course be suitably adjusted to employ equivalent amounts of the free base considering the molecular weight of the acid moiety thereof. It has also been found by actual clinical tests that the minimum total daily oral dosage required to achieve the desired result is usually about 25 milligrams and the maximum about 300 milligrams, and for optimum results, between about 75 and about 150 milligrams of active ingredient per patient treated, with the minimum dropping down somewhat to about 15 milligrams per day in the case of small children. The preferred dosages, as will be understood, vary greatly with the individual, his body weight, and his tolerances or intolerances, and must be ascertained by the physician in each case. Expressed in terms of percentages, the active ingredient in the novel compositions of the present invention ordinarily comprises from 0.1 to about 80 weight percent, preferably from about 0.5 to about 60 percent, varying because of the form which the composition takes from very low in liquid preparations and bulky tablets or liquids, as in combination with antacids or other coactive materials, to quite high in the case of tablets containing the single active ingredient or other solid dosage forms. With most solid dosage forms, the percentage is preferably about ten to sixty percent by weight of the composition.

The method of the invention, as will be apparent from the foregoing, is the process of reducing appetite and weight and thereby controlling obesity which comprises orally administering to a human being an effective amount, e.g., from about five to about seventy-five milligrams, preferably fifteen to fifty milligrams, of the hydrochloride of 1-(para-chlorophenyl)-2-methyl-2-aminopropane or 1-(para-bromophenyl)-2-methyl-2-aminopropane or the equivalent of another pharmacologically acceptable acid addition salt thereof per unit dose, in the form of an oral composition together with a non-toxic pharmaceutical carrier or diluent. The daily dose per patient is usually from about 15 to about 300 milligrams, preferably between about 75 and 150 milligrams, in terms of the active ingredient.

The following examples are given by way of illustration only and are not to be construed as limiting.

Example 1.—Tablet Formulation

A suitable formulation for a tablet containing 25 milligrams of 1-(para-chlorophenyl)-2-methyl-2-aminopropane in the form of its hydrochloride is as follows:

|  | Mg. |
|---|---|
| 1-(p-chlorophenyl)-2-methyl-2-aminopropane | 25 |
| Potato starch | 50 |
| Lactose | 20 |
| Gelatine | 3 |
| Talcum | 15 |

Tablets having the above composition were prepared and found effective upon administration to humans in reduction of appetite and weight in accord with the present invention.

Example 2.—Tablet Formulation

Another suitable formulation for a tablet containing 25 milligrams of 1-(para-chlorophenyl)-2-methyl-2-aminopropane in the form of its hydrochloride is as follows:

|  | Mg. |
|---|---|
| 1-(p-chlorophenyl)-2-methyl-2-aminopropane | 25 |
| Corn starch | 70 |
| Gelatine | 3 |
| Talcum | 15 |

Example 3.—Tablet Formulation

A suitable formulation for a tablet containing 50 milligrams of 1-(para-chlorophenyl)-2-methyl-2-aminopropane in the form of its citrate is as follows:

|  | Mg. |
|---|---|
| 1-(p-chlorophenyl)-2-methyl-2-aminopropane | 50 |
| Corn starch | 50 |
| Lactose | 20 |
| Gelatine | 3 |
| Talcum | 15 |

Example 4.—Tablet Formulation

A suitable formulation for a tablet containing 50 milligrams of 1-(para-bromophenyl)-2-methyl-2-aminopropane in the form of its hydrochloride and 250 milligrams of magnesium trisilicate as an antacid is as follows:

|  | Mg. |
|---|---|
| 1-(p-bromophenyl)-2-methyl-2-aminopropane | 50 |
| Magnesium trisilicate | 250 |
| Corn starch | 100 |
| Saccharose | 50 |
| Talcum | 25 |
| Magnesium stearate | 3 |

Example 5.—Liquid Oral Formulation

A suitable formulation for 1 liter of a liquid mixture containing 25 milligrams of 1-(para-chlorophenyl)-2-methyl-2-aminopropane in the form of its hydrochloride in each five milliliters of the mixture is as follows:

|  | G. |
|---|---|
| 1-(p-chlorophenyl)-2-methyl-2-aminopropane | 5 |
| d-Sorbitol | 700 |
| Methylparaben | 0.5 |
| Propylparaben | 0.05 |
| Tincture of bitter orange peel | 15 |
| Purified water to make a total of 1000 ml. |  |

Example 6.—Animal Experiments

In order to demonstrate the combination of anorexigenic action and absence of central stimulatory action of the compositions according to the invention, experiments were carried out on animals.

(a) The anorexigenic action of 1-(para-chlorophenyl)-2-methyl-2-aminopropane and 1-(para-bromophenyl)-2-methyl-2-aminopropane in the form of their hydrochlorides was recorded in feeding experiments on rats during a five-day control period and a ten-day experimental period. When 0.025% amphetamine, 0.05% phenmetrazine, 0.05% 1-(p-chlorophenyl)-2-methyl-2-aminopropane and 0.05% 1-(p-bromophenyl)-2-methyl-2-aminopropane, respectively, was mixed with the feed, a weight *loss* of 39 grams, zero grams, 32 grams and 34 grams, respectively, occurred during the experimental period. In a control group the weight *gain* recorded during the same period was 36 grams.

(b) It has also been found that rats actually eat less when 1-(p-chlorophenyl)-2-methyl-2-aminopropane or 1-(p-bromophenyl)-2-methyl-2-aminopropane is injected intraperitoneally. This indicates that the anorexia is not due to an alteration in taste or to an action upon the intestine.

(c) The central-stimulatory action of 1-(p-chlorophenyl)-2-methyl-2-aminopropane and 1-(p-bromophenyl)-2-methyl-2-aminopropane is far less than that of amphetamine and also less than that of phenmetrazine. Two milligrams of amphetamine/kg. and 32 mg. phenmetrazine/kg. respectively administered intraperitoneally to mice increased motor activity by 100% as compared with untreated controls. On the other hand, 50 mg./kg. of 1-(p-chlorophenyl)-2-methyl-2-aminopropane or 1-(p-bromophenyl)-2-methyl-2-aminopropane intraperitoneally did not perceptibly increase the motor activity, in each case measured according to standard procedure by the amount of sand which sifted through the bottom of the cages.

(d) Unlike amphetamine, 1-(p-chlorophenyl)-2-methyl-2-aminopropane and 1-(p-bromophenyl)-2-methyl-2-aminopropane have been found not to shorten the period of sleep induced by hexobarbitone.

Example 7.—Clinical Evaluation

In clinical tests on human beings, the compositions of the invention have shown pronounced appetite and weight reducing effect. Fifty-one obese out-patients were carried through a double-blind weight reduction program employing tablets having the composition of Example 1 and placebo tablets without any essential dietary restrictions. On administration of the composition of the invention they obtained a weight loss significantly in excess of that experienced by the patients on placebo. Objective side effects were negligible and subjective side effects were relatively moderate.

It is to be understood that the invention is not limited to the exact details of operation or exact compounds or compositions shown and described, as obvious modifications and equivalents will be apparent to one skilled in the art, and the invention is therefore to be limited only by the scope of the appended claims.

We claim:

1. An oral pharmaceutical composition, having selective anti-appetite and weight-reducing properties with a minimum of central stimulatory effect, which is useful in controlling obesity, comprising in unit dosage form an effective quantity of between about five and about 75 milligrams of a compound selected from the group consisting of 1-(para-chlorophenyl)-2-methyl-2-aminopropane, 1-(para-bromophenyl)-2-methyl-2-aminopropane, and non-toxic pharmacologically acceptable acid addition salts thereof, and a non-toxic pharmaceutical diluent.

2. An oral pharmaceutical composition, having selective anti-appetite and weight-reducing properties with a minimum of central stimulatory effect, which is useful in controlling obesity, comprising in unit dosage form an effective quantity of between about ten milligrams and about 50 milligrams of a non-toxic pharmacologically acceptable acid addition salt of 1-(para-chlorophenyl)-2-methyl-2-aminopropane, and a non-toxic pharmaceutical diluent.

3. An oral pharmaceutical composition, having selective anti-appetite and weight-reducing properties with a minimum of central stimulatory effect, which is useful in controlling obesity, comprising in unit dosage form an effective quantity of between about fifteen milligrams and about fifty milligrams of 1-(para-chlorophenyl)-2-methyl-2-aminopropane hydrochloride, and a non-toxic pharmaceutical diluent.

4. An oral pharmaceutical composition, having selective anti-appetite and weight-reducing properties with a minimum of central stimulatory effect, which is useful in controlling obesity, comprising in unit tablet dosage form an effective quantity of between about five and about 75 milligrams of a compound selected from the group consisting of 1-(para-chlorophenyl)-2-methyl-2-aminopropane, 1-(para-bromophenyl)-2-methyl-2-aminopropane, and non-toxic pharmacologically acceptable acid addition salts thereof, and a non-toxic solid pharmaceutical tableting adjuvant.

5. An oral pharmaceutical composition, having selective anti-appetite and weight-reducing properties with a minimum of central stimulatory effect, which is useful in controlling obesity, comprising in unit tablet dosage form an effective quantity of between about five milligrams and about 50 milligrams of a non-toxic pharmacologically acceptable acid addition salt of 1-(para-bromophenyl)-2-methyl-2-aminopropane, and a non-toxic pharmaceutical diluent.

6. An oral pharmaceutical composition, having selective anti-appetite and weight-reducing properties with a minimum of central stimulatory effect, which is useful in controlling obesity, comprising in unit tablet dosage form an effective quantity of between about five milligrams and about fifty milligrams of 1-(para-bromophenyl)-2-methyl-2-aminopropane hydrochloride, and a non-toxic solid pharmaceutical tableting adjuvant.

7. An oral pharmaceutical composition, having selective anti-appetite and weight-reducing properties with a minimum of central stimulatory effect, which is useful in controlling obesity, comprising in unit dosage form an effective quantity of from about five to fifty milligrams of 1-(para-chlorophenyl)-2-methyl-2-aminopropane hydrochloride and a non-toxic solid pharmaceutical tableting adjuvant.

8. The method of reducing appetite and controlling weight in a human being, which comprises orally administering to the human being a non-toxic composition containing an effective amount, at least about five milligrams, of a compound selected from the group consisting of 1-(para-chlorophenyl)-2-methyl-2-aminopropane, 1-(para-bromophenyl)-2-methyl-2-aminopropane, and pharmacologically acceptable acid addition salts thereof.

9. The method of reducing appetite and controlling weight in a human being, which comprises orally administering to the human being a non-toxic composition containing an effective amount, at least about five milligrams, of a pharmacologically acceptable acid addition salt of 1-(para-chlorophenyl)-2-methyl-2-aminopropane.

10. The method according to claim 9, wherein the pharmacologically acceptable acid addition salt is the hydrochloride of 1-(para-chlorophenyl)-2-methyl-2-aminopropane and the non-toxic composition administered to the human being contains at least about 15 milligrams of the said acid addition salt together with a solid pharmaceutical carrier.

11. The method according to claim 10, wherein the non-toxic composition is administered to the human being so as to provide a daily dose between about 25 and 300 milligrams of the said acid addition salt.

12. The method according to claim 10, wherein the non-toxic composition is administered to the human being so as to provide a daily dose between about 75 and 150 milligrams of the said acid addition salt.

13. A method of reducing appetite and controlling weight in a human being, which comprises orally administering to the human being an anorexigenically effective amount of a compound selected from the group consisting of 1-(para-chlorophenyl)-2-methyl-2-aminopropane, 1-(para-bromophenyl)-2-methyl-2-aminopropane, and pharmacologically acceptable acid addition salts thereof.

References Cited in the file of this patent

UNITED STATES PATENTS 2,990,332    Keating    June 27, 1961

FOREIGN PATENTS 819,129    Switzerland    Aug. 26, 1959

OTHER REFERENCES

Wedekin et al.: C.A., vol. 24, 1930, p. 598.
Alles: J. of Pharm. and Exp. Thera., vol. 47, 1933, p. 341.
Abbott et al.: Am. J. Med. Sci., vol. 193, 1937, p. 661.
Bachman, J.A.C.S. 76, August 5, 1954.